United States Patent
Comstock

(10) Patent No.: US 10,034,296 B2
(45) Date of Patent: Jul. 24, 2018

(54) SMALL CELL UPLINK INTERFERENCE MITIGATION

(71) Applicant: Kyocera Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 161 days.

(21) Appl. No.: 14/366,212

(22) PCT Filed: Dec. 20, 2012

(86) PCT No.: PCT/US2012/070938
§ 371 (c)(1),
(2) Date: Jun. 17, 2014

(87) PCT Pub. No.: WO2013/096616
PCT Pub. Date: Jun. 27, 2013

(65) Prior Publication Data
US 2014/0328309 A1    Nov. 6, 2014

Related U.S. Application Data

(60) Provisional application No. 61/577,786, filed on Dec. 20, 2011.

(51) Int. Cl.
*H04W 72/08* (2009.01)
*H04W 72/04* (2009.01)

(52) U.S. Cl.
CPC ...... *H04W 72/082* (2013.01); *H04W 72/0426* (2013.01)

(58) Field of Classification Search
None
See application file for complete search history.

(56) References Cited

U.S. PATENT DOCUMENTS

| | | | |
|---|---|---|---|
| 9,264,976 B2* | 2/2016 | Khandekar | H04W 48/08 |
| 2010/0106828 A1* | 4/2010 | Palanki | H04L 1/0028 709/224 |

(Continued)

FOREIGN PATENT DOCUMENTS

WO    WO 2012/148338    11/2012

OTHER PUBLICATIONS

Kyocera Corp., "Carrier-based HetNet ICIC", 3GPP TSG-RAN WG3 #74, R3-112965, Nov. 14-18, 2011, San Francisco, CA.

(Continued)

*Primary Examiner* — Suk Jin Kang

(57) ABSTRACT

Identifying a interfering, candidate or suspect of interfering (interferer) user device, UE, being served by a first base station (macro eNB) and causing uplink interference on a second base station (small cell). The first base station (macro eNB) transmits uplink channel configuration information (PRACH configuration info) to the second base station (small cell). The first base station (macro eNB) receives an Interference indication message, comprising an indication that a cell of the second base station (small cell) is experiencing uplink interference form at least one user device. For each of a plurality of user devices being served by the first base station (macro eNB), the first base station (macro eNB), assigns a preamble to the user device, UE, and transmits the assigned preamble to the user device, UE. The first base station (macro eNB) also transmits the assigned preambles to the second base station (small cell). The first base station (macro eNB) then receives a list of preambles detected at the second base station, and identifies the at least one interfering user device, UE, based on the received list.

28 Claims, 7 Drawing Sheets

(56) References Cited

U.S. PATENT DOCUMENTS

| | | | | |
|---|---|---|---|---|
| 2010/0255854 A1* | 10/2010 | Lee | H04W 72/082 | 455/450 |
| 2010/0303183 A1* | 12/2010 | Desai | H04L 5/0062 | 375/350 |
| 2011/0080893 A1* | 4/2011 | Fong | H04W 36/0055 | 370/331 |
| 2011/0092235 A1* | 4/2011 | Chang | H04B 17/318 | 455/507 |
| 2011/0105135 A1* | 5/2011 | Krishnamurthy | H04W 16/10 | 455/450 |
| 2011/0116481 A1* | 5/2011 | Wang | H04W 16/16 | 370/336 |
| 2011/0117967 A1* | 5/2011 | Vedantham | H04B 7/024 | 455/561 |
| 2011/0143674 A1* | 6/2011 | Lim | H04W 72/082 | 455/63.1 |
| 2011/0170440 A1* | 7/2011 | Gaal | H04W 72/082 | 370/252 |
| 2011/0201369 A1* | 8/2011 | Kim | H04W 8/00 | 455/507 |
| 2011/0237243 A1* | 9/2011 | Guvenc | H04L 5/0032 | 455/423 |
| 2011/0237265 A1* | 9/2011 | Sugawara | H04L 1/1887 | 455/450 |
| 2011/0250913 A1* | 10/2011 | Vajapeyam | H04W 74/0833 | 455/507 |
| 2012/0015659 A1* | 1/2012 | Kalyani | H04W 72/085 | 455/436 |
| 2012/0021788 A1* | 1/2012 | Yavuz | H04W 36/30 | 455/501 |
| 2012/0040619 A1* | 2/2012 | Zhu | H04W 72/082 | 455/63.1 |
| 2012/0040642 A1* | 2/2012 | Zhu | H04W 72/082 | 455/411 |
| 2012/0046028 A1* | 2/2012 | Damnjanovic | H04W 24/02 | 455/423 |
| 2012/0115535 A1* | 5/2012 | Jeong | H04W 52/146 | 455/522 |
| 2012/0258724 A1* | 10/2012 | Kim | H04W 72/082 | 455/452.2 |
| 2012/0275394 A1* | 11/2012 | Gunnarsson | H04W 28/048 | 370/329 |
| 2012/0294396 A1* | 11/2012 | Desai | H04L 5/0062 | 375/343 |
| 2012/0300715 A1* | 11/2012 | Pelletier | H04W 56/0005 | 370/329 |
| 2013/0039195 A1* | 2/2013 | Weng | H04W 48/20 | 370/252 |
| 2013/0217402 A1* | 8/2013 | Lin | H04W 72/12 | 455/450 |
| 2013/0219055 A1* | 8/2013 | Palanki | H04L 1/0028 | 709/224 |
| 2013/0242874 A1* | 9/2013 | Li | H04W 48/10 | 370/328 |
| 2013/0336274 A1* | 12/2013 | Simonsson | H04W 16/32 | 370/329 |
| 2013/0343241 A1* | 12/2013 | Niu | H04B 15/00 | 370/280 |
| 2014/0036786 A1* | 2/2014 | Kazmi | H04W 52/146 | 370/329 |
| 2014/0044108 A1* | 2/2014 | Earnshaw | G01S 5/0063 | 370/336 |
| 2014/0112254 A1* | 4/2014 | Lindoff | H04W 74/002 | 370/328 |
| 2014/0119320 A1* | 5/2014 | Vajapeyam | H04W 74/0833 | 370/329 |
| 2014/0120967 A1* | 5/2014 | Purnadi | H04W 72/1226 | 455/501 |
| 2014/0126523 A1* | 5/2014 | Gunnarsson | H04W 28/048 | 370/329 |
| 2014/0342729 A1* | 11/2014 | Damnjanovic | H04B 7/0617 | 455/422.1 |
| 2015/0334731 A1* | 11/2015 | Chen | H04W 36/0094 | 370/329 |

OTHER PUBLICATIONS

Ericsson, "Analysis of PCell/SCell selection for UL Interference mitigation," 3GPP TSG-RAN WG# #74, R3-113044, Nov. 14-18, 2011, San Francisco, CA.

* cited by examiner

PRIOR ART

SMALL CELL UPLINK INTERFERENCE MITIGATION

PRIORITY

This application claims priority to U.S. Provisional Patent App. No. 61/577,786, filed Dec. 20, 2011, and titled "Pico Cell Uplink Interference Mitigation," the entirety of which is hereby incorporated herein by reference.

FIELD OF THE INVENTION

The systems and methods disclosed herein relate generally to interference mitigation, and more particularly to facilitating the mitigation of uplink interference caused by user equipment within the uplink range of a small cell.

BACKGROUND

Cellular or mobile networks are radio networks which may be distributed over a large geographical area. The geographical area is divided into "cells." Each cell is served by a base station, which may serve more than one cell, and which is comprised of at least one radio transceiver, terrestrial transmission circuits, and computer processors for processing data and executing protocols and/or procedures for communicating with other base stations and with other networking equipment. For purposes of this disclosure, a cell may include all functions of the associated base station.

A base station is often fixed in location, and may comprise an evolved node B (eNB) on a Long Term Evolution (LTE) system. Together, the base stations may comprise a wireless wide area network (WWAN). The WWAN can also be communicatively coupled with a public or private network, which may include that particular aggregation of networks commonly known as the Internet.

The cellular network may comprise both "macrocells" and "small cells." A macrocell provides radio coverage served by a high-power cellular base station, which typically has power outputs of tens of watts, and may be mounted on ground-based masts, rooftops, and other existing structures, at a height that provides a clear view over surrounding buildings and/or terrain. Small cells, on the other hand, are low-powered base stations, encompassing, for instance, femtocells, picocells, and microcells. Whereas a macrocell may have a range of a few kilometers or more, small cells generally have ranges of less than a couple kilometers (e.g., in a rural setting), and frequently within the range of a couple hundred meters or less (e.g., 10 meters within an urban setting). Mobile operators often use small cells to extend their service coverage and/or increase network capacity, for example, by offloading traffic from macrocells to small cells during peak traffic times.

User equipment, which may be mobile and moving, is configured to establish connections with the base stations of the macrocells and small cells which form the cellular network. As used herein, the term "user equipment" (UE) may refer to any type of device, including, without limitation, a mobile station, such as a mobile communication device (e.g., smart phone or other wireless phone or transceiver), tablet computer, and/or laptop computer, as well as a desktop computer. The connections formed between UEs and base stations may be established, for example, according to wireless specifications, such as LTE, Code Division Multiple Access (CDMA), Global System for Mobile Communications (GSM), Universal Mobile Telecommunication System (UMTS), or the like. Through these connections with the base stations, the UEs are able to establish voice and/or data communications with each other and other transceivers or receivers within the network or within other connected networks, including the Internet.

Small cells, such as femtocells, picocells, and microcells, may operate within, or adjacent to, the coverage area of large macrocells to form a heterogeneous network. Such a network can provide more uniform quality of broadband services across the coverage area of the macrocells. For example, small cells may compensate for macrocell radio signal degradation caused by obstruction, path loss, or interference. However, when a macrocell and nearby small cells operate on the same radio carrier, there may be co-channel interference between cells that may affect the effectiveness of the heterogeneous network. While operators may avoid such interference by allocating separate radio carriers to the macrocells and small cells, this can impact carrier utilization efficiency, and operators may be too limited in the amount of available spectrum to afford such an allocation. Therefore, interference mitigation techniques are often used when small cells are deployed.

A common technique to mitigate co-channel interference between UEs being served by a macrocell ("macrocell UE") and UEs being served by a small cell ("small-cell UE") is to divide a carrier's resources between the macrocell and the small cell. For example, in systems that use Orthogonal Frequency-Division Multiplexing (OFDM) based multiple access, such as LTE, some of a carrier's subcarriers may be allocated for serving UEs that are nearer to the center of the macrocell ("cell-center UEs") and other subcarriers may be allocated for serving UEs that are nearer to the edge of the macrocell ("cell-edge UEs"). The small-cell UEs are served using the subcarriers allocated for the macrocell UEs nearer to the center of the macrocell.

In some deployments, a small cell may also use the subcarriers allocated for macrocell UEs near the edge of the macrocell, but the transmission power of the small cell UEs is restricted. Thus, the macrocell UEs nearer to the edge of the macrocell do not interfere with the small-cell UEs, and the macrocell UEs nearer to the center of the macrocell are separated by distance from the small-cell UEs. When a macrocell UE moves close to the edge of the macrocell and close to the small cell, measurement reports from the macrocell UE can trigger the macrocell to restrict the UE's resource assignments to those subcarriers allocated for macrocell UEs nearer to the edge of the macrocell.

As an illustrative example, in an LTE system, there are mechanisms which can be used to assist base stations in assigning resources for cell-center and cell-edge UEs. For instance, UEs are capable of providing a serving base station with measurement reports of the downlink signal strength of neighbor cells. These measurement reports have been commonly used in mobile systems to assist with handovers to other cells. However, for interference management, this measurement reporting capability has been expanded to allow a base station to determine whether the UE is operating within the center region of a cell or whether the UE is operating with the edge region of the cell. Triggers for downlink signal strength measurement reporting have been defined to help the macrocell to determine when a UE is crossing the boundary between the cell-center region and the cell-edge region. However, these triggers are dependent upon the UE detecting and measuring the downlink signal strength of a neighbor base station.

Using similar mechanisms, operators can also deploy multiple carriers within the coverage areas of macrocells and small cells and dynamically control the use of these carriers in order to increase spectrum efficiency. Interference can be controlled by allocating a carrier or carriers for macrocell UEs nearer to the center of the macrocell and small-cell UEs, and allocating a different carrier for macrocell UEs nearer to the edge of the macrocell's coverage area and nearer to the small cell. When the macrocell UE moves close to the macrocell edge and close to the small cell, it can be handed over to the other macrocell carrier or to the small cell in order to avoid interference with the small cell.

However. FIG. 1 illustrates a scenario in which a UE being served by a macrocell may interfere with the operation of a small cell without triggering a handover. As shown, small cell 130 operates within coverage area 122 of macrocell 120 and has unbalanced or asymmetrical uplink and downlink coverage. This imbalance between uplink coverage area 132 and downlink coverage area 134 of small cell 130 may occur, for example, it the small cell's downlink transmission power is reduced in order to control downlink interference from small cell 130. Specifically, uplink range 132 represents the area in which the small cell is able to receive an uplink signal from UE 110, and has a greater coverage area than downlink range 134, which represents the area in which the UE 110 is able to receive a downlink signal from small cell 130. While small cell 130 is shown as operating entirely within the range 122 of macrocell 120, it should be understood that the following description of an interference scenario applies to any instance in which at least a portion of the uplink range 132 of small cell 130 is within the coverage area 122 of macrocell 120.

Macrocell 120 and small cell 130 operate on one or more common radio carriers, such that UEs utilizing the macrocell, such as UE 110, and UEs utilizing small cell 130 may experience co-channel interference. For example, in the scenario illustrated in FIG. 1, UE 110 is being served by macrocell 120, and is operating on at least one radio carrier frequency that small cell 130 may utilize for the UEs being served by small cell 130. UE 110 may have been as the common carrier either as a primary cell (PCell) or secondary cell (SCell). UE 110 is within the uplink coverage area of small cell 130, but is not within the downlink coverage area of small cell 130. In other words, small cell 130 can receive uplink signals from UE 110, but UE 110 is unable to receive downlink signals from small cell 130. Consequently, UE 110's uplink signal is interfering with small cell 130, but UE 110 is unable to detect the downlink of small cell 130.

If the downlink and signals were balanced, the downlink signal strength at UE 110 could trigger a measurement event of UE 110. In the case without uplink-downlink imbalance, UE 110 would measure the downlink signal strength of small cell 130. UE 110 would then send the measurement information to macrocell 120. This transmission of measurement information would normally inform macrocell 120 about the potential interference at small cell 120 caused by UE 110. Based on the measurement information, macrocell 120 would then determine what corrective action, if any, should be taken. For example, macrocell 120 may initiate a handover procedure to hand over UE 110 to be served by small cell 130, or to continue to be served by macrocell 120 but on a different radio carrier.

However, in the scenario illustrated in FIG. 1, the downlink signal from small cell 130 is not detected by UE 110. Thus, a measurement event is not triggered. Consequently, macrocell 120 is unaware that UE 110 is causing interference for small cell 130, and therefore, unable to mitigate the interference through a corrective action, such as a handover. Small cell 130 could report the uplink interference to macrocell 120, for example, over a terrestrial connection between the two base stations, such as an X2 interface of the LTE specification. However, even if macrocell 120 is informed of the interference, it would be unable to take corrective action since macrocell 120 may be servicing multiple UEs, and the identity of the particular UE causing the interference is unknown to both macrocell 120 and small cell 130 since the interfering UE does not report the small cell downlink signal strength. Accordingly, there is a need for mechanisms to identify UEs causing uplink interference in cases where the interfering UE is not able to be identified based on signal strength measurement reports from the UE.

The LTE specification includes several mechanisms to assist base stations in coordinating the mitigation of uplink interference between cells. One mechanism is the Uplink (UL) High Interference Indication (HII) parameter. This parameter may be used by a first base station to notify a second base station about certain subcarriers of a common operating carrier that are being allocated for resource assignments for UEs near the edge of a cell of the first base station. When the second base station is a small cell base station, as in the scenario illustrated in FIG. 1, and it receives the HII parameter, it should avoid assigning the certain subcarriers to its served UEs, or should only assign the certain subcarriers to UEs transmitting with lower power.

Another LTE mechanism for interference control is the Uplink Interference Overload Indication (OI) parameter, which may be exchanged between base stations and provides uplink interference information about one of the sending base station's cells, where the particular subcarriers with an uplink, interference measurement that is above a certain threshold are identified for a particular carrier, the uplink interference measurements have been averaged over a time period, and the uplink interference is likely being caused by one of the receiving base station's cells. In some implementations, OI may be used in conjunction with HII to notify a base station when the interference levels dictated by the base station's HII parameters for a cell are not being met, such that the uplink interference levels of a cell of another base station have exceeded a threshold. An illustrative case is where a small cell is operating on the same frequency resources (e.g., subcarriers) as cell-center macrocell UEs, and one or more of these macrocell UEs are causing excessive uplink interference to the small cell. The small cell base station can report this interference to the macrocell base station using the OI parameter, and in response, the macrocell may change the boundary between its cell-center and its cell-edge regions, such that macro UEs are assigned resources from the frequency resources allocated for cell-edge UEs before they cause uplink interference to the small cell. Another illustrative example is the case where a small cell and a macrocell are operating on a common carrier, and the small-cell UEs are causing excessive uplink interference to the macrocell. The macrocell base station can report this interference to the small cell base station using the OI parameter, and the small cell may reduce the uplink transmission power of its UEs.

These current mechanisms for coordinating uplink interference mitigation between base stations by exchanging uplink interference information (i.e., identifying protected subcarriers and reporting subcarriers with excessive interference over a time period) are not suitable for resolving uplink interference in the scenario illustrated in FIG. 1. Specifically, in the illustrated scenario, there is a need to identify macrocell UE that is causing the uplink interference to small cell 130. However, a macrocell UE may be assigned different uplink sub carriers for each transmission, depending on the radio conditions at the time of assignment. Thus, identifying the subcarriers on which the interference occurs does not help to identify the interfering UE. In addition, the small cell uplink interference caused by a macrocell UE may not meet the criteria for triggering an OI report over the measurement period, but may still cause significant interference to the small cell. Thus, what is needed is to novel uplink interference indicator that may be exchanged between base stations.

SUMMARY

Accordingly, systems methods are disclosed for mitigating uplink interference with a small cell caused by a UE being served by a macrocell. Specifically, in an embodiment, systems and methods are disclosed for base stations to report uplink interference to other base stations, and for identifying macrocell user device(s) that are causing the uplink interference to small-cell user devices, when there is an uplink-downlink imbalance in the coverage of the small cell that causes a situation in which the macrocell user device(s) are unable to detect and report the downlink of the small cell to the macrocell, and, as a result, the macrocell base statins net able to identify the interfering macrocell UE(s) based or its small-cell downlink reports.

In an embodiment, a method for identifying an interfering user device being served by a first base station of a cellular network is disclosed. The method comprises, by the first base station: transmitting configuration information for the first base station to second base station, wherein the configuration information comprises an identification of one or more resources allocated to an uplink channel of the first base station; receiving an interference indication message from the second base station, the interference indication message comprising an indication that a cell of the second base station is experiencing uplink interference from at least one interfering user device; for each of a plurality of user devices being served by the first base station, assigning a preamble to the user device; transmitting the preambles assigned to the plurality of user devices to the second base station; for each of the plurality of user devices, transmitting a message comprising the preamble, assigned to the user device, to the user device; receiving a list of preambles from the second base station, wherein the list of preambles comprises one or more preambles which were detected at the second base station from one of the plurality of user devices; and identifying the at least one interfering user device based on the list of preambles. In embodiments, the method further comprises transmitting transmission times associated with the preambles assigned to the plurality of user devices to the second base station. In addition, the method may further comprise receiving signal strengths associated with the preambles in the list of preambles from the second base station.

In an additional embodiment, a system for mitigating interference at a base station of a cellular network is disclosed. The system comprises a first base station configured to: transmit configuration information for the first base station to a second base station, wherein the configuration information comprises an identification of one or more resources allocated to an uplink channel of the first base station; receive an interference indication message from the second base station, the interference indication message comprising an indication that a cell of the second base station is experiencing uplink interference from at least one interfering user device; for each of a plurality of user devices being served by the first base station, assign a preamble to the user device; transmit the preambles assigned to the plurality of user devices to the second base station; for each of the plurality of user devices, transmit a message comprising the preamble, assigned to the user device, to the user device; receive a list of preambles from the second base station, wherein the list of preambles comprises one or more preambles which were detected at the second base station from one of the plurality of use devices; and identify the at least one interfering user device based on the list of preambles. In embodiments, the first base station is further configured to transmit transmission times associated with the preambles assigned to the plurality of user devices to the second base station. In addition, the first base station may be further configured to receive signal strengths associated with the preambles in the list of preambles from the second base station.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
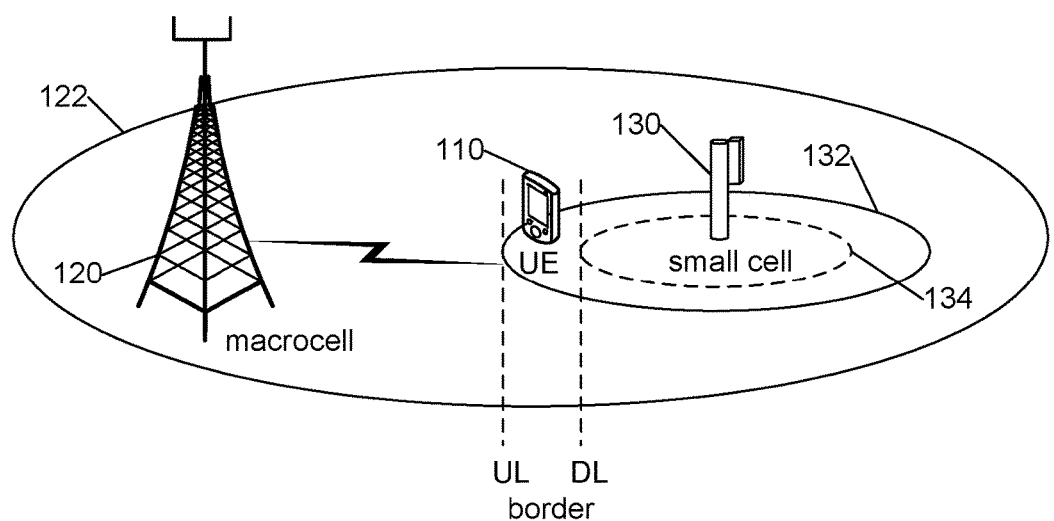
FIG. 1 illustrates a scenario in which a UE may cause interference on an uplink channel of a small cell.

In an embodiment, the disclosed systems and methods provide a means for a macrocell and small cell to cooperate to identify interfering UE(s). At high level, the macrocell initiates a transmission of information, such as a preamble, from one or more potentially interfering UEs on the uplink control and/or uplink data channel of the macrocell. The small cell may receive transmission resource information concerning this channel of the macrocell, and use this information to receive the transmission of information from the one or more potentially interfering UEs. The results of transmissions received by the small cell can then be sent to and used by the macrocell to identify the interfering UE(s). As used herein, the term "cell" may refer to a base station of the cell.

It should be understood that, although the systems and methods will be described herein with reference to a macrocell and small cell, the disclosed systems and methods are applicable to any pair of cells in which one or more of the cells has unbalanced uplink and downlink coverage areas (e.g., combinations of macrocell and macrocell, as well as small cell and small cell). It should also be understood that these systems and methods are not limited to pairs of cells, but may be utilized with any number of overlapping cells (e.g., three or more). Furthermore, while embodiments may be described herein in relation to a LTE system, it should be understood that the systems and methods disclosed herein are equally applicable to other systems.

Overview of Preamble Usage on PRACH in LTE

In an embodiment, the disclosed systems and methods make use of the Random Access (RA) procedure used in LTE systems, or a comparable procedure, in which a UE transmits a preamble sequence in pre-established radio resources (e.g., frequency and time allocations), and in which a first base station that provided the access opportunity detects and decodes the preamble transmission. The first base station may provide a second base station with the transmission parameters for one or more of its UEs' preamble transmissions. The second base station may detect and decode one or more of these UE preamble transmissions, and provide the first base station with the associated preamble value and an indication of the signal strength measurement of the one or more received preamble transmissions. The first base station may then use this information, received from the second base station, to identify UEs that are potentially causing uplink interference at the second base station.

In mobile systems, such as LTE systems, UE performs a physical non-synchronized RA procedure whenever it attempts to access a base station to which its uplink is not synchronized. A UE's uplink is synchronized to a base station when its uplink transmission time has been adjusted to compensate for the propagation delay between the UE and the base station. The propagation delay is generally dependent on the distance between the UE and the base station. The UE may perform the RA procedure when it powers on, transitions from an idle mode to a connected mode, is handed over between neighboring base stations, receives a Physical Downlink Control Channel (PDCCH) order from a base station, etc. In general, in an LTE system, whenever the LTE is unsynchronized with an eNB, it may only access the eNB using the RA procedure. Additionally, in a LTE system, the RA procedure may be performed as part of a procedure for determining the geographical position of a UE.

In LTE systems, the first step of the RA procedure is that a UE transmits a preamble on a Physical Random Access Channel (PRACH). The preamble is a sequence (e.g., a binary sequence) that is selected from a cell-specific set of sequences that are defined in the LTE physical layer specifications. Sequences of preambles are generally partitioned or allocated between neighboring cells so as to prevent the use of the same preamble by neighboring cells, such that a UE can be uniquely identified by a cell according to the UE's preamble transmission. Preambles are designed to facilitate detection even when a UE has not yet synchronized its uplink signal with the receiving eNB. The preamble transmission allows the eNB to determine the propagation delay between the UE and the eNB. The eNB then provides the UE with to timing advance value which indicates at what time the UE should begin its uplink transmissions to compensate for the propagation delay. It should be understood that, while preambles will be discussed primarily herein in relation to LTE systems, other systems use identical or similar techniques. Accordingly, the disclosed systems and methods can be easily adapted to any such system by an individual having skill in the art.

Preambles may be used in a contention-less procedure (also known as a non-contention-based procedure) or a contention-based procedure. In a contention-less procedure, a UE is assigned as unique preamble by the base station being accessed. The assigned preamble is unique relative to other assigned preambles for a cell. Thus, the UE can use the unique preamble to access the base station without having to contend with other UEs utilizing the same preamble. In contrast, in a contention-based procedure, two UEs may utilize the same preamble. Thus, the procedure must be able to resolve conflicts caused by the use of the same preamble by two separate UEs. Such conflict resolution means are well-known in the art and will not be discussed in detail herein.

Preamble transmission on the PRACH is designed to raise the detection probability when the UE and eNB are not synchronized in the uplink channel, and to facilitate the determination of the propagation delay. In LTE systems, PRACH transmission time duration is generally one to three milliseconds, and may include a Cyclic Prefix, the preamble, and a guard time period to handle timing uncertainty. There are multiple formats for the duration of the Cyclic Prefix, preamble, and guard time, for dealing with different amounts of delay, and there are means for handling frequency offsets between a UE and an eNB.

Identification of Interfering User Equipment

Figure 2:
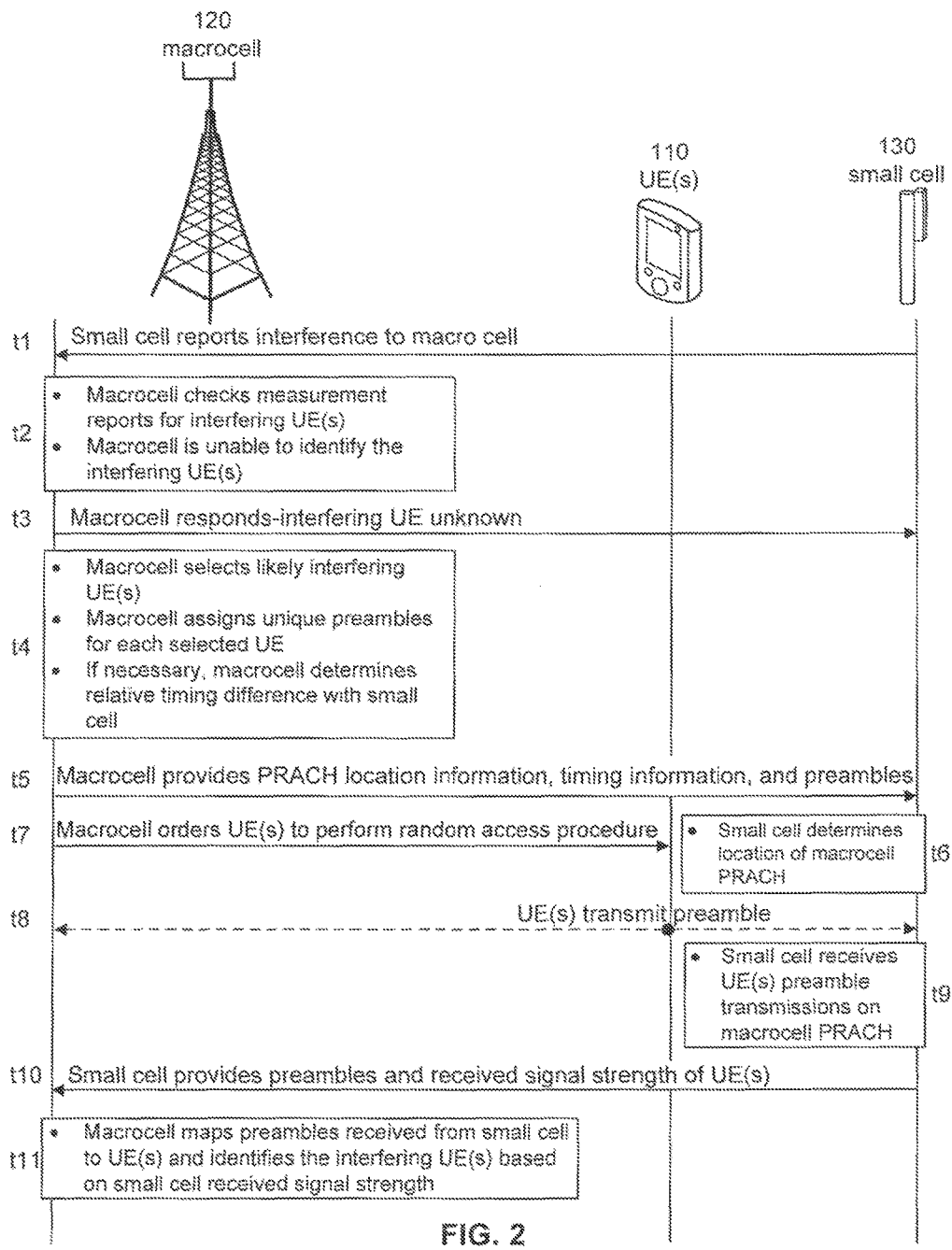
FIG. 2 illustrates signaling for a method of identifying an interfering UE, according to an embodiment.

FIG. 2 is a diagram of the signaling for a process of identifying one or more interfering UEs, according to an embodiment. As discussed above, small cell 130 detects uplink interference from one or more unidentified UEs, not being served by small cell 130, on a radio carrier, which is being utilized, for instance, by both macrocell 120 and small cell 130. The small cell may be a femtocell, picocell, microcell, or other type of cell (including a macrocell) with an uplink coverage area 132 which overlaps a coverage area 122 of macrocell 120.

At time t1, small cell 130 transmits a message to macrocell 120 to report uplink interference from a UE (e.g., UE 110). For example, this notification may be provided over a terrestrial connection between the two base stations of small cell 130 and macrocell 120. The X2 interface of the LTE specification is one such connection which may be utilized for such notifications, as well as other communications between macrocell 120 and small cell 130 discussed herein. However, it should be understood that alternative or additional methods of communication (e.g., wireless communication) between macrocell 120 and small cell 130 are possible. The particular method of communication used between the macrocell 120 and small cell 130 is not critical to the disclosed embodiments, and suitable communication methods are well-known in the art. Accordingly, such methods will not be discussed in detail herein.

In an embodiment, the small cell base station 130 provides the macrocell base station 120 with an indication of uplink interference associated with a particular carrier. This interference indication may be sent as soon as possible after the interference has been detected, or may be sent after interference has been detected over a period of time. In an embodiment, this interference indication is not associated with particular subcarriers of the carrier or with particular subframes within a frame or with any other time period, and the interference indication does not include an indication of the interference power level. However, in other embodiments, such information may be included. Furthermore, the uplink interference indication may be—but is not restricted to be—comprised of a single bit of information for one carrier.

At time t2, macrocell 120 may attempt to identify the interfering UE. For example, macrocell 120 may check downlink signal strength measurement reports associated with small cell 130 that have been received from UEs being served by macrocell 120. Based on these measurement reports, macrocell 120 may attempt to determine the interfering UE. For example, UEs reporting strong downlink signal strength from small cell 130 may be the most likely source of interference in the uplink of small cell 130. Normally, these UEs would most likely be handed over to small cell 130 or handed over to a different carrier in order to avoid causing interference to small cell 130 and to avoid downlink interference from small cell 130. However, in the scenario illustrated in FIG. 1, in which there is an imbalance in the downlink and uplink coverage areas of small cell 130, a UE interfering in the uplink of small cell 130 may not detect the downlink of small cell 130. Consequently, if there is such an imbalance, the interfering UE will not report the downlink signal strength measurement of small cell 130.

At time t3, macrocell 120 may respond to small cell 130. If macrocell 120 cannot determine the identity or identities of the interfering UE(s), the response may comprise a notification that the interfering UE(s) are unknown to macrocell 120. However, if macrocell 120 is able to determine the identity or identities of the interfering UE(s), at time t3, macrocell 120 may notify small 130 that it has identified the interfering UE(s), and perform corrective action. In an alternative embodiment, the response, at time t3, to the interference indication may be omitted.

At time t4, macrocell 120 may perform one or more actions for facilitating the identification of the interfering UE(s). For example, macrocell 120 may firstly attempt to narrow down the list of UEs being served by macrocell 120 to generate a list of one or more suspect UEs which are most likely interfering with small cell 130. In an embodiment, macrocell 120 may select only those UEs meeting one or more criteria (e.g., a location) indicative of a UE potentially interfering with small cell 130. As an illustrative example, the macrocell's selection of likely interfering macrocell UEs may be based on stored information that the macrocell base station 120 has collected from reports from served UEs, as well as information received from other base stations near macrocell 120, including small cell 130. For instance, neighbor cell information may be reported by neighboring base stations, including small cell 130, at the time that the connections between the macrocell base station 120 and the other base stations are established. Macrocell 120 may also use stored geometry information that was collected in the past from macrocell UEs that detected and provided measurements for small cell 130. This information may be correlated with information known about a potentially interfering macrocell UE, such as measurements reports received from this macrocell UE to cells it was be to detect, the timing advance being used with the macrocell, and/or interference reports received from other base stations. Macrocell 120 may be configured to select a maximum number of suspect UEs (e.g., 3, 10, 25, 50, 100). This number may be a pre-determined system setting (e.g., network-wide, region-specific, cell-specific) or determined by macrocell 120 and/or cell 130 (e.g., according to an algorithm, table, or the like). Alternatively, the macrocell 120 may treat every UE being served by the macrocell 120 as a suspect UE (i.e., potentially interfering UE). However, eliminating some of the served UEs from consideration can reduce overhead and increase efficiency.

It should be understood that this process of narrowing down the universe of macrocell UEs to list of one or more potentially interfering UEs may occur at any time prior to t5. For example, at time t2, macrocell 120 may attempt to generate a list of potentially or likely interfering UEs, and, if the number of macrocell UEs in the list exceeds a number of interfering UEs reported by small cell 130, then macrocell 120 may determine that it is unable to identify the interfering UEs and respond to small cell 130 at time t3. On the other hand if the number of potentially interfering UEs in the suspect list is identical and/or exceeds the number of interfering UEs reported by small cell 130, or if it is otherwise clear which UE(s) are the interfering UE(s), then macrocell 120 may identify the list of potentially interfering UEs as the interfering UEs and take corrective action for one or more or each of the UEs in the suspect list. This is simply an illustrative, non-limiting example. In a preferred embodiment, macrocell 120 does not rely on small cell 130 to provide, a number of interfering UEs, since generally small cell 130 is only able to determine that interference is occurring on its uplink and is not able to determine whether uplink interference being caused by one UE or multiple UEs.

In an embodiment, macrocell 120 assigns or maps preambles to the list of suspect UEs identified by macrocell 120. As discussed above, each preamble may be a sequence (e.g., a binary sequence) that is selected from a set of sequences that are specific to macrocell 120. For example, macrocell 120 may be allocated a partitioned set of preambles that are different than those of its neighboring cells, including small cell 130. Macrocell 120 may select preambles from the macrocell's allocated set of preambles, and assign a selected preamble to each UE in the list of suspect UEs. This selection and assignment of preambles may be random or according to known techniques, such as a sequence or algorithm. In an embodiment which uses contention-less preambles, each of the multiple selected and assigned preambles can be unique relative to the other ones of the assigned preambles. Macrocell 120 may store the mapping or associations of preambles to UEs in memory using a database, table, array, or other data structure. In this manner, macrocell 120 may subsequently determine which UE corresponds to a particular preamble by performing a lookup using an identification of the preamble.

In an embodiment, at time t4, macrocell 120 may also estimate a timing advance or timing advance adjustment for each UE in the list of suspect UEs. This estimation process is described in further detail below with reference to FIGS. 4-7.

At time t5, macrocell 120 may communicate access information to small cell 130. This access information enables small cell 130 to receive the uplink control channel and/or uplink data channel of macrocell 120 (e.g., PRACH). In an embodiment, the access information may comprise access channel information which identifies radio resources used by macrocell 120, such as PRACH configuration information, PRACH radio resource location information, time slot or other timing information, subcarrier information, frequency information, and the like. Alternatively or additionally, this access information may be provided to small cell 130 at any other time prior to time t8. The access information may further comprise one or more preambles or an identification of one or more preambles (e.g., an index and/or algorithm or other data that the small cell 130 may apply to determine the preambles itself), and/or the radio resources (e.g., frequency and time allocation) associated with the transmission of the one or more preambles. This preamble information may comprise the preambles, or identifications of preambles, assigned to the UEs in the list of suspect UEs.

At time t6 (or at any time prior to time t8), small cell 130 may utilize the access information received from macrocell 120 to determine the location of the macrocell's uplink access channel (e.g., PRACH). Using the preamble information contained in the access information, small cell 130 may receive transmissions, within small cell's uplink coverage area 132, that are sent on the uplink access channel of macrocell 120 corresponding to the access information. Accordingly, small cell 130 will be able to receive the preambles transmitted by macrocell UEs (e.g., as part of a RA procedure with macrocell 120) that are within the uplink coverage area 132 of small cell 130.

At time t7, macrocell 120 may transmit, to each sit the UEs in the list of suspect UEs, a message (such as the PDCCH Order used in LTE) to trigger the transmission of the preamble that the macrocell 120 assigned to the UE on the radio resources of an uplink channel, such as the PRACH of macrocell 120. The message may comprise the preamble or an identification of the preamble to be transmitted. In an embodiment, the message may also comprise the radio resources within the PRACH of macrocell 120) to be used for the preamble transmission. In embodiments which utilize contention-less preambles, each of the UEs will receive a preamble that is different than the preamble received by each of the other suspect UEs. In an embodiment, the order is an order for the UE to perform a RA procedure. In such an embodiment, the order may comprise a standard order to, perform a conventional RA procedure, as already defined in the LTE specification.

In the order sent at time t7 or in a different message, macrocell 120 may also transmit, to each of the UEs in the list of suspect UEs, the timing advance information estimated for the UE. As discussed below, this timing advance information may comprise a timing advance or a timing advance adjustment for small cell 130. However, in an embodiment, a UE simply treats this timing advance information as the timing advance information for macrocell 120 and attempts the RA procedure with macrocell 120 utilizing the timing advance information. Thus, from the macrocell UEs perspective, it is attempting a normal RA procedure with macrocell 120, and may be unaware that small cell 130 will be receiving or attempting to receive the preamble transmitted by the UE.

At time t8, which represents one or more uplink transmission opportunities (e.g., PRACH transmission opportunities), each of the UEs, which received an order from macrocell 120, may transmit the preamble in an uplink signal (e.g., as part of a standard RA procedure). Different UEs may transmit at different uplink transmission opportunities. Each UE may transmit the preamble on an uplink control channel or data channel of macrocell 120. For example, the UEs may transmit their respective preambles on the PRACH of macrocell 120. In addition, the UEs may transmit their respective preambles according to their respective timing advance information, as estimated by and received from macrocell 120.

By time t9, small cell 130 may have received, on the uplink channel of macrocell 120, the preamble from each of the macrocell UEs within the uplink coverage area of small cell 130, including one or more interfering UEs. Accordingly, at time t10, small cell 130 may transmit the preamble(s) received from the macrocell UE(s) to macrocell 120. At time t11, macrocell 120 performs a lookup on the stored mapping between UEs and preambles, using the preamble(s) received at time 110 from small cell 130. This mapping will return an identification of the likely interfering UE(s) associated with the preamble(s) received at small cell 130.

In an embodiment, even if small cell 130 is able to receive a preamble from a UE that it is not serving, it is not automatically assumed that the UE is an interfering UE. Rather, at time t11 or at a prior or subsequent time, small cell 130 may transmit, in addition to the received preamble(s), the signal strength of each UE, for which a preamble(s) was received, to macrocell 120. In other words, for each received preamble, small cell 130 transmits an identification of the preamble and the signal strength with which the preamble transmission received. Thus macrocell 120 receives a set of preambles and associated signal strengths. Macrocell 120 can then sort or otherwise compare the received signal strengths to determine which UE(s) are most likely to be interfering with small cell 130. In an embodiment, it is assumed that the UE(s) with the highest signal strengths are most likely to be the interfering UE(s). In other words, the higher the signal strength received from the UE, the more likely it is to be an interfering UE, and the lower the signal strength received from the UE, the less likely it is to be an interfering UE. Accordingly, macrocell 120 may perform a lookup on the stored mapping to identify the interfering UE(s), based on the preambles corresponding to the highest signal strength(s). For example, macrocell 120 may determine that the three UEs with the highest signal strength at small cell 130 are the interfering UEs. In another embodiment, macrocell 120 may estimate the signal strength of the data channel transmission from a macrocell UE that small cell 130 would receive based on the signal strength of the preamble received from small cell 130. Macrocell 120 can then determine the interfering UEs based on the data transmission signal strength measurement.

Once macrocell 120 has identified the interfering UE(s), macrocell 120 may select and perform one or more corrective actions to mitigate the interference to small cell 130. For example, the corrective action may comprise handing over the interfering UE(s) to be served by small cell 130. As another example, the corrective action may comprise handing over the interfering UE(s) to a different radio carrier being operated by macrocell 120. Such handover to techniques are well-known in the art, and therefore, will not be described in detail herein.

Identification of Interfering User Equipment in a LTE System

Figure 3:
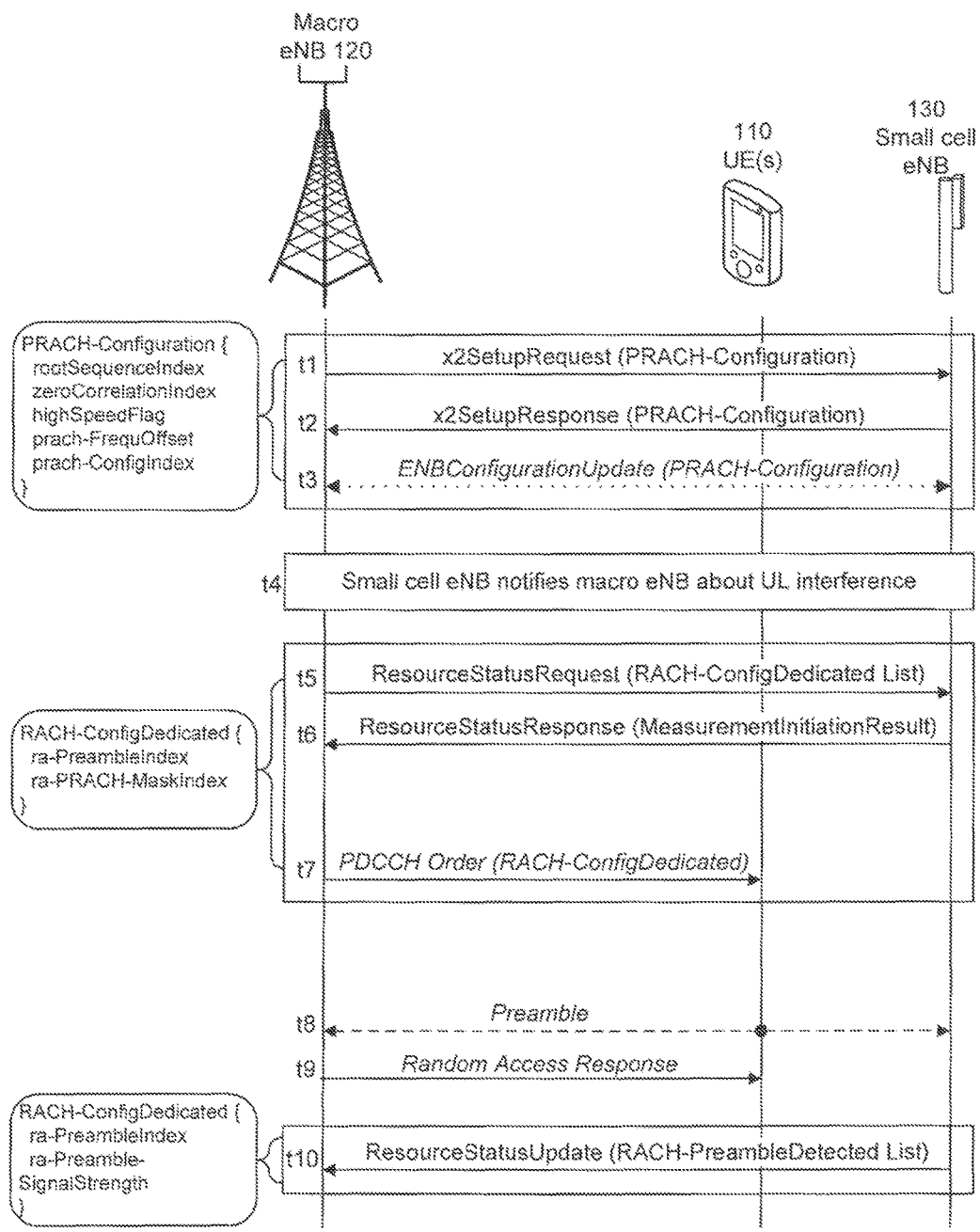
FIG. 3 illustrates signaling for a method of identifying an interfering UE, according to an embodiment that is intended for a LTE system.

FIG. 3 is a diagram of the signaling for a process of identifying one or more interfering UEs, according to an embodiment that is specific to a LTE system. This embodiment may utilize new parameters and/or modifications to messages or parameters that are currently already supported in the LTE specification.

Initially, PRACH configuration and general preamble index information is exchanged between macrocell 120 and small cell 130. This enables small cell 130 (which may be, for example, a pico eNB) to identify the radio resources used for the PRACH of macrocell 120 (which may be, for example, a macro eNB) and the set of preambles used by macrocell 120. The exchange of "common" PRACH configuration information between eNBs of an LTE system is already supported in the LTE specification using X2SetupRequests messages and X2SetupResponse messages, and ENBConfigurationUpdate messages. However, changes to the these messages may be necessary to support some embodiments disclosed herein, such as requiring the inclusion of time resources associated with a macrocell PRACH.

At time t1, an X2SetupRequest is transmitted from macrocell 120 to small cell 130. It should be understood that time t1 may represent an initialization time of macrocell 120 and/or small cell 130. In response to the X2SetupRequest, at time t2, small cell 130 returns to X2SetupResponse. Each of the X2SetupRequest and X2SetupResponse may comprise a PRACH-Configuration information element (IE), which may comprise one or more parameters that define the PRACH configuration information required to receive preamble transmissions on the sending eNB's PRACH. For example, the X2SetupRequest may comprise parameters defining the PRACH configuration information for macrocell 120, and the X2SetupResponse may comprise parameters defining the PRACH configuration information for small cell 130. However, these descriptions simply represent embodiments if the setup messages. The setup messages may be implemented in any suitable manner, provided that, at some time, small cell 130 receives configuration information for an uplink channel of macrocell 120.

The parameters defining the PRACH configuration of macrocell 120 (e.g., in the PRACH-Configuration IE sent in the X2SetupRequest and/or X2SetupResponse) may include, for instance, parameters that are already defined in the LTE specification, such as rootSequenceIndex, zeroCorrelationIndex, highSpeedFlag, PRACH-FreqOffset and PRACH-ConfigIndex. This is the same information that UEs obtain from a cell's broadcast message SystemInformationBlockType2 (SIB2), or from a Handover Command (i.e., RRCConnectionReconfiguration). The rootSequenceIndeX zeroCorrelationZoneCOnfiguration, and hignSpeedFlag allow small cell 130 to know the set of preambles used by macrocell 120. The PRACH-FrequencyOffset provides the starting subcarrier for the macrocell's PRACH. In addition, the PRACH-ConfigurationIndex indicates the possible subframes used for the preamble transmissions to macrocell 120.

At time t3, or at any time or times following the exchange of the X2SetupRequest and X2SetupResponse messages, macrocell 120 and small cell eNB 130 may exchange one or more ENBConfigurationUpdate messages to update the sending cell's configuration information at the recipient cell. For example, if the PRACH configuration of small cell 130 changes, small cell 130 may send an ENBConfigurationUpdate message to macrocell 120. This message may comprise an updated PRACH-Configuration IE.

At some time t4, small cell 130 notifies macrocell 120 about uplink interference detected at small cell 130. In an embodiment, small cell 130 may notify macrocell 120 about the uplink interference using a Load Indication procedure. The Load Indication procedure is already defined in the LTE system, and provides a mechanism for an eNB to send an interference overload indication to a neighboring eNB when the eNB experiences interference on some resource blocks in its uplink channel. In an embodiment, the Load Indication procedure may provide an uplink interference indicator of a type not currently defined in the LTE specification. This interference indication may be sent as soon as possible after the interference has been detected, or may be sent after interference has been detected for a predefined time period. In an embodiment, this interference in is not associated with particular subcarriers of the earner or with particular subframes within a frame or with any other time period. In addition, in an embodiment, the interference indication does not include an indication of the interference power level. However, in alternative embodiments, such information may be included. Furthermore, the uplink interference indication may be—but is not required to be—comprised of a single bit of information for one carrier.

After time t4 and before time t5, macrocell 120 may generate a list of likely or potentially interfering UE(s), as described above. Macrocell 120 may also assign a unique preamble to each UE in the list of suspect UEs. Each of these assignments or mappings may be stored in a memory of macrocell 120 as an association between a UE identifier and the preamble assigned to the UE.

At time t5, a ResourceStatusRequest may be sent from macrocell 120 to small cell 130. The ResourceStatusRequest is already defined in the LTE specification, but, in an embodiment, is modified to comprise a list, referred to herein as RACH-ConfigDedicatedList IE. The ResourceStatusRequest message, as presently defined the LTE specification, is used to initiate a measurement in the receiving cell according to parameters provided in the message, in the case that the RegistrationRequest IE in the message is set to "start," or stop all cell measurements and terminate the reporting, in the case that the RegistrationRequest IE in the message is set to "stop." If the RegistrationRequest IE is set to "start," then the ResourceStatusRequest message includes a ReportCharacteristics IE, comprising a bitmap. The ReportCharacteristics IE indicates the type of objects on which the recipient cell (e.g., small cell 130) should perform measurements. In an embodiment, this ReportCharacteristics IE is modified by the addition of a RACH-PreambleDetect bit added to the bitmap of the ReportCharacteristics IE.

The RACH-ConfigDedicatedList IE, which is added to the ResourceStatusRequest, comprises a list of one or more RACH-ConfigDedicated IEs. Each UE in the list of suspect UEs will correspond to a different RACH-ConfigDedicated IE. Each RACH-ConfigDedicated IE may comprise a ra-PreambleIndex parameter and a ra-PRACH-MaskIndex parameter. These parameters are already defined in the LTE specification, and are the same parameters that are provided to a UE in a PDCCH Order for RA preamble transmission. The ra-PreambleIndex parameter identifies the preamble assigned to the corresponding UE from the possible preambles for macrocell 120, and the ra-PRACH-MaskIndex parameter provides a specific subframe used for the preamble transmission by the UE from the set of possible subframes. The ra-PreambleIndex may not be the preamble itself, but may instead identify an index into an allocation of preambles used by macrocell 120 (e.g., a list of sixty-four preambles used by macrocell 120). As discussed above, this allocation of preambles allocated or available to macrocell 120 may be known to small cell 130 through the exchange of configuration information.

In response to the ResourceStatusRequest sent by macrocell 120, at time t6, small cell 130 may transmit an acknowledgement to macrocell 120, which indicates that small cell 130 is prepared to begin the preamble-detection transmission process for identifying the interfering UE(s). In an embodiment, this acknowledgement may comprise the ResourceStatusResponse message presently defined in the LTE specification. The ResourceStatusResponse message is provided by a cell (e.g., small cell 130 in this case) to indicate that it is capable of providing some or all of the requested resource status information requested in the ResourceStatusRequest message. If the cell is able to provide all requested resource status information, the cell initiates the measurement and returns the ResourceStatusResponse message. If, the cell is able to provide some, but not all, of the requested resource status information, and a PartialSuccessIndicator IE is present in the ResourceStatusRequest message, the cell initiates measurements for the admitted measurement objects, in either case, the ResourceStatusResponse message may include the MeasurementInitiationResult IE of the LTE specification. If the cell is not able to provide any of the requested resource status information, it may return a ResourceStatusFailure message instead of the ResourceStatusResponse message. However, it should be understood that neither the ResourceStatusResponse nor the ResourceStatusFailure message is necessary to the identification of interfering UE(s), and may be omitted in some embodiments.

At time t7, macrocell 120 sends a message to trigger each suspect UE to transmit its assigned preamble on an uplink channel (e.g., PRACH) of macrocell 120. For instance, in an embodiment, macrocell 120 sends a PDCCH Order or Handover Command (e.g., RRCConnectionReconfiguration) to each of the macrocell UEs in the list of suspect UEs. Each PDCCH Order may comprise a RACH-ConfigDedicated IE. These RACH-ConfigDedicated IEs may be identical in structure to those in the RACH-ConfigDedicatedList, described above, that were sent to small cell 130. For example, each PDCCH Order may comprise a RACH-ConfigDedicated IE comprising a ra-PreambleIndex parameter, which provides the preamble assigned to the recipient UE, and a ra-PRACH-MaskIndex parameter, which provides the specific subframe to be used for a preamble transmission by the recipient UE. However, instead of the RACH-ConfigDedicated IEs being sent in a list to small cell 130 (i.e., at time t5), each RACH-ConfigDedicated data object is sent to a different corresponding one of the macrocell UEs in the list of suspect UEs. In particular, a RACH-ConfigDedicated IE comprising the ra-PreambleIndex parameter value corresponding to the preamble assigned to a UE, as well as the ra-PRACH-MaskIndex parameter value assigned to the UE, is sent to that UE.

The PDCCH Order or Handover Command causes each recipient UE to perform a RA procedure. Thus, at time t8, which represents one or more PRACH transmission opportunities, each recipient UE transmits the UE's assigned preamble on the PRACH of macrocell 120. Since small cell 130 has the access information for this PRACH of macro eNB 120, small cell 130 can "eavesdrop" on the PRACH of macrocell 120. However, small cell 130 will only be able to receive transmissions, on the PRACH of macrocell 120, which have been transmitted by UE(s) within the uplink coverage area 132 of small cell 120, and for which small cell 130 has received the transmission configuration. Conversely, small cell 130 will not receive any transmissions from UE(s) outside the uplink coverage area 132 of small cell 120. Thus, small cell 130 will receive the preambles sent by potentially interfering macrocell UE(s) within the small cell's uplink coverage area 132.

At time t9 or at any time after time t8, macrocell 120 may transmit a RA response to each UE, from which it received a preamble transmission at time t8, to complete the RA procedure. This response is part of the RA procedure, and is not necessary to the identification of interfering UEs. Accordingly, in some embodiments, the RA response may be omitted.

At time t10, small cell 130 transmits a list of preambles received on the uplink channel (e.g., PRACH) of macrocell 120 to macrocell 120. As discussed above, these preambles represent those preambles which were received by suspect macrocell UEs within the uplink coverage area of small cell 130. In an embodiment, small cell 130 only maintains and transmits information for a preamble detected on the PRACH macrocell 120 that corresponds to a preamble and time slot identified by a RACH-ConfigDedicated IE in the RACH-ConfigDedicatedList IE of the ResourceStatusRequest sent at time t5.

In an embodiment, the transmission of this list of preambles comprises a ResourceStatusUpdate message modified to include a RACH-PreambleDetectedList IE. The ResourceStatusUpdate message is a part of the Resource Status Reporting procedure that was initiated with the ResourceStatusRequest message sent by macrocell 120 at time t5, and is used in the LTE specification to report the results of the measurements requested by the ResourceStatusRequest message. The RACH-PreambleDetectedList IE may be included in the ResourceStatusUpdate message whenever the RACH-PreambleDetect bit is set in the ReportCharacteristics IE of the ResourceStatusRequest message.

The RACH-PreambleDetectedList IE is a new IE, that is not currently part of the LTE specification, and may comprise one or more RACH-PreambleDetected IEs. The RACH-PreambleDetected IE is also a new IE that is not currently part of the LTE specification. Each RACH-PreambleDetected IE may comprise the ra-PreambleIndex parameter, which identifies a detected preamble as mentioned above, and a ra-Preamble-SignalStrength parameter. The ra-Preamble-SignalStrength parameter is a new IE, which is not currently part of the LTE specification, and which provides an indication of the signal strength detected at small cell 130 for the preamble identified by the ra-PreambleIndex parameter.

Once macrocell 120 has received the ResourceStatusUpdate message identifying the preambles detected by small cell 130, macrocell 120 may identify the UEs corresponding to the detected preambles by matching each detected preamble to a UE using the stored associations between preambles and UE identifiers described above. Specifically, for each preamble detected by small cell 130, macrocell 120 may identify the UE associated with that preamble, in this manner, macrocell 120 may determine which macrocell UE(s) are within the uplink coverage area 132 of small cell 130, and therefore, potentially interfering with the uplink channel of small cell 130.

As discussed above, macrocell 120 can, but may not necessarily, assume that each detected macrocell UE is an interfering UE. Alternatively, macrocell 120 may instead select a subset of the UEs detected by small cell 130. For example, as discussed elsewhere herein, macrocell 120 may select this subset of detected UEs based on the signal strengths with which the assigned preamble was detected by small cell 130. As discussed above, these signal strengths may have been communicated to macrocell 120 as a parameter associated with a preamble in each RACH-PreambleDetected IE sent by small cell 130 at time t10. Once this subset of detected UEs has been determined, macrocell 120 may perform a corrective action for each UE in the subset of detected UEs. For example, the corrective action may comprise handing over the interfering UE to be served by small cell 130, or handing over the interfering UE to a different radio carrier being operated by macrocell 120.

For ease of description, the signal and process timing in FIGS. 2 and 3 has been described in a particular sequence. However, the signaling and/or processing need not occur in the exact same sequences as described. Rather, embodiments of the signaling and processing steps described herein may occur in different sequences. For example, with reference to FIG. 2, the processes described as occurring at time t4 may or at the same time as the processes described as occurring at time t2. As another illustrative example, the processes described as occurring at trees t5 and t6 in FIG. 2 may occur at any time prior to time t8. In addition, in some embodiments, one or more of the signals and/or processes may be omitted and/or one or more signals or processes may be added. For example, again with reference to FIG. 2, the response signal sent from the macrocell to the small cell, in response to the interference report, may be omitted, and/or an acknowledgement of the signal sent from the macrocell to the small cell at time t5 may be sent from the small cell to the macrocell. As another illustrative example, with reference to FIG. 3, the RA response message sent at time t9 may occur before, after, or at the same time as, the ResourceStatusUpdate message at time t10, since these messages are independent of each other. Thus, while likely occurring contemporaneously, they need not occur in any particular sequence. Alternatively, the RA response message may be omitted altogether. As yet another illustrative example, with reference to FIG. 3, macrocell 120 may not necessarily receive the preamble transmission, but rather use the reception of the message at t5 as a trigger to send the RA Response in order to reduce the UE's power transmission requirements. It should be understood that other variations of the signal timings in FIGS. 2 and 3 are possible.

Estimation of Timing Advance

Typically, when a UE accesses, a new base station, the UE first synchronizes with the new base station's downlink channel by adjusting its frame and subframe timing to the downlink of the base station using the base station's downlink control signals. For uplink transmissions in mobile communications systems, such as LTE, a UE must compensate for transmission or propagation delay between the UE and the base station with which the UE is attempting to communicate. Otherwise, transmissions from the UE will not arrive at the base station at the proper time, i.e., the assigned subframe at which the base station is expecting to receive, and thus looking for, the UE transmission. Consequently, a UE must compensate for the transmission delay between the UE and the base station with which it is communicating. Thus, it needs to know how such time before the start of its downlink subframe it must transmit. This timing compensation is called the "timing advance," and determining the uplink timing advance is called "uplink synchronization."

For uplink synchronization, a UE uses the RA procedure, for example, and transmits a preamble to the new base station. However, since the transmission delay from the UE to the base station is not yet known, the UE has not synchronized with the uplink channel of the base station. Thus, the UE first transmits a preamble to the new base station on the uplink channel with the UE's uplink subframe time aligned with its downlink subframe time, i.e., with a timing advance of zero. Accordingly, the preamble transmission includes a timing gap to allow for timing uncertainty. Once the base station receives the preamble transmission from the UE, the base station is able to detect the preamble and determine the necessary timing advance for the UE's subsequent transmissions. The base station then transmits the timing advance to the UE using over-the-air signaling. Accordingly, the UE is informed of the timing advance by the base station.

Figure 4:
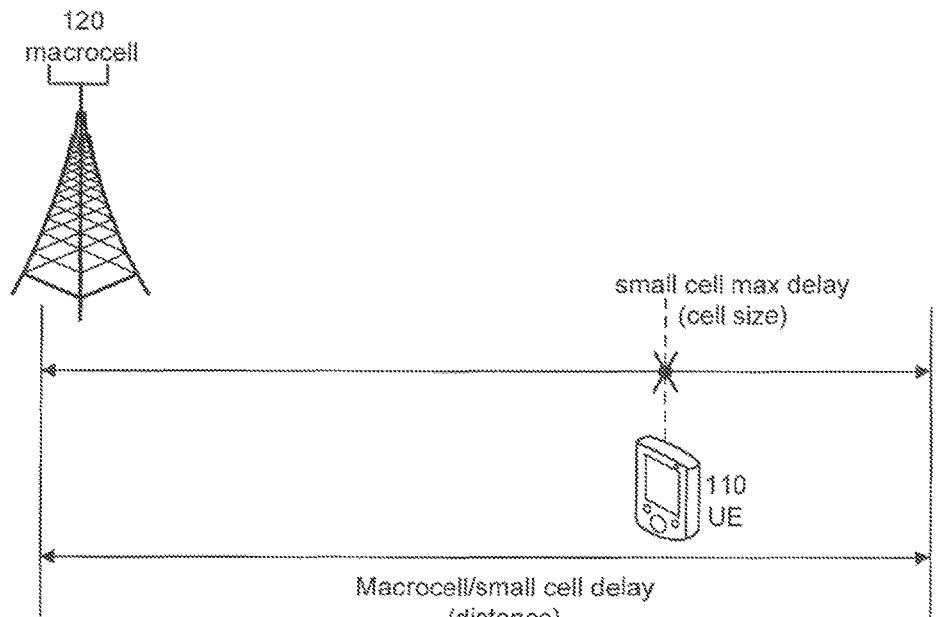
FIG. 4 illustrates a difference in timing advances for a UE with respect to a macrocell and small cell.
Figure 5:
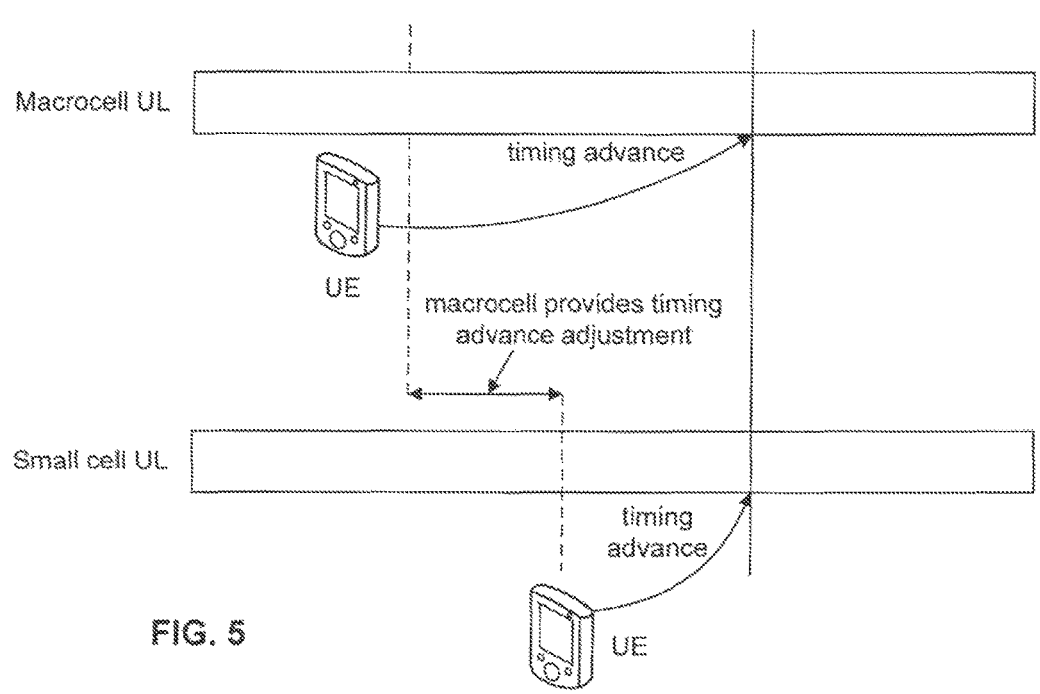
FIG. 5 illustrates a timing advance adjustment, according to an embodiment.
Figure 6:
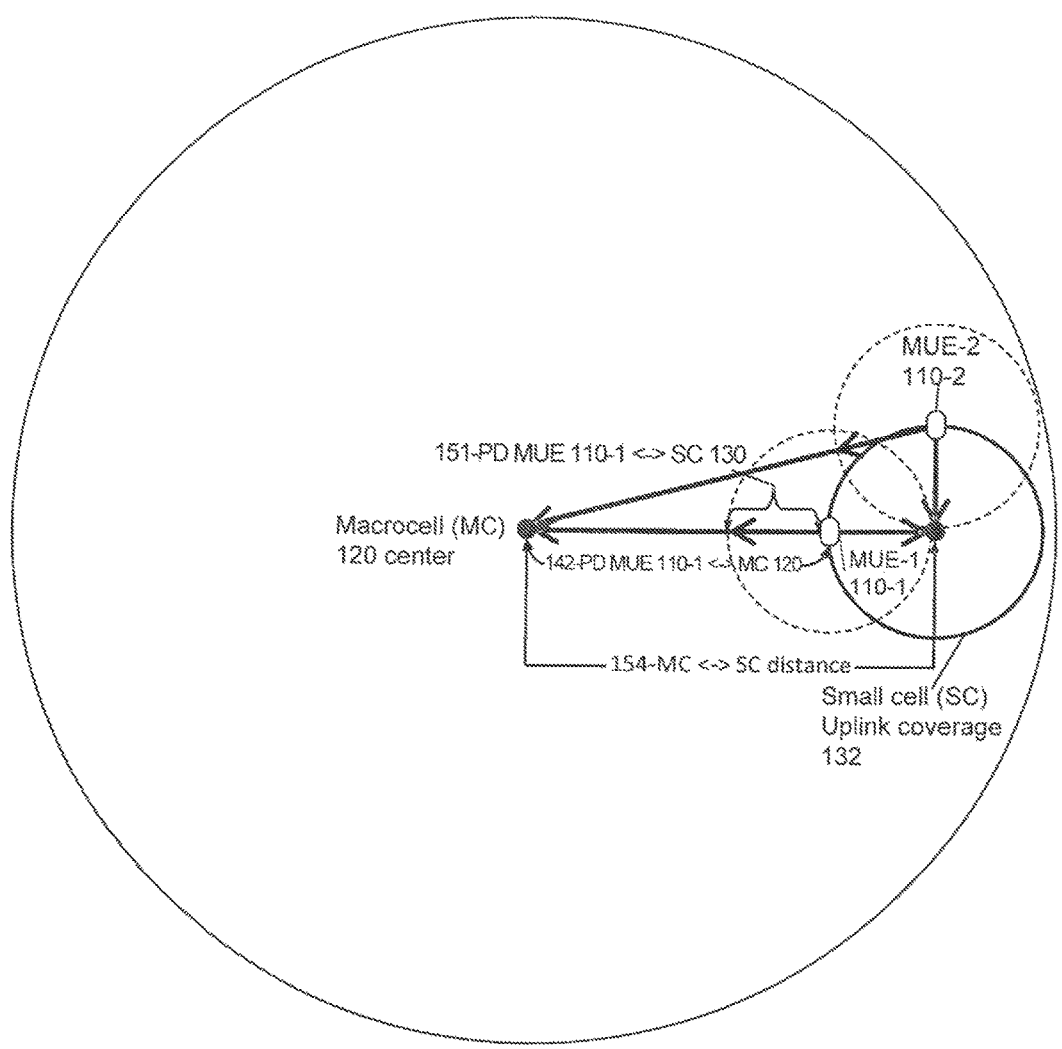
FIG. 6 illustrates relationships between a macrocell, small cell, and UEs in a described scenario.

However, in the scenario illustrated in FIG. 1, small cell 130 is meant to detect transmissions from macrocell UE 110, but macrocell UE 110 is synchronised to macrocell 120. This means that the macrocell UE's downlink subframe timing is set to receive downlink transmissions from macrocell 120, and its uplink subframe timing is set according to a timing advance provided by macrocell 120, such that both the downlink and uplink subframe timing of macrocell UE 110 is based on the propagation delay (e.g., distance) between macrocell UE 110 and macrocell 120. The downlink subframe timing of macrocell UE 110 is delayed from the macrocell downlink subframe timing by the amount of the propagation delay between UE 110 and macrocell 120, and the uplink subframe timing of macrocell UE 110 is advance from the macrocell uplink subframe timing by the amount of the propagation delay between them. The timing advance provided by macrocell 120 to UE 110 is twice the value of the propagation delay between them, since the timing advance is referenced to the timing of the downlink of UE 110. That is, the timing advance value corresponds to the round-trip time between UE 110 and macrocell 120. As illustrated in FIGS. 4 and 6, the distance between macrocell UE 110 and small cell 130 is different than the distance between macrocell UE 110 and macrocell 120. Therefore, as illustrated in FIG. 5, the timing advance would be different for a small cell UE at the same location as a macrocell UE, which may affect the ability of small cell 130 to detect the macrocell UE's preamble transmission. FIG. 5 illustrates the case where the frames and subframes macrocell 120 and small cell 130 are aligned. That is, they are synchronized with each other. This is the case for some LTE network deployments, but is not required by the LTE specification. When frames and subframes of cells are aligned, the targeted absolute time to receive transmissions from UEs, as set by the timing advance for both macro UEs and small cell UEs, would be the same, as illustrate in FIG. 5. This can simplify the process of ensuring that small cell 130 can receive a macrocell UE preamble transmission, since macrocell 120 would know the absolute timing of the small cell's frames and subframes.

Figure 7:
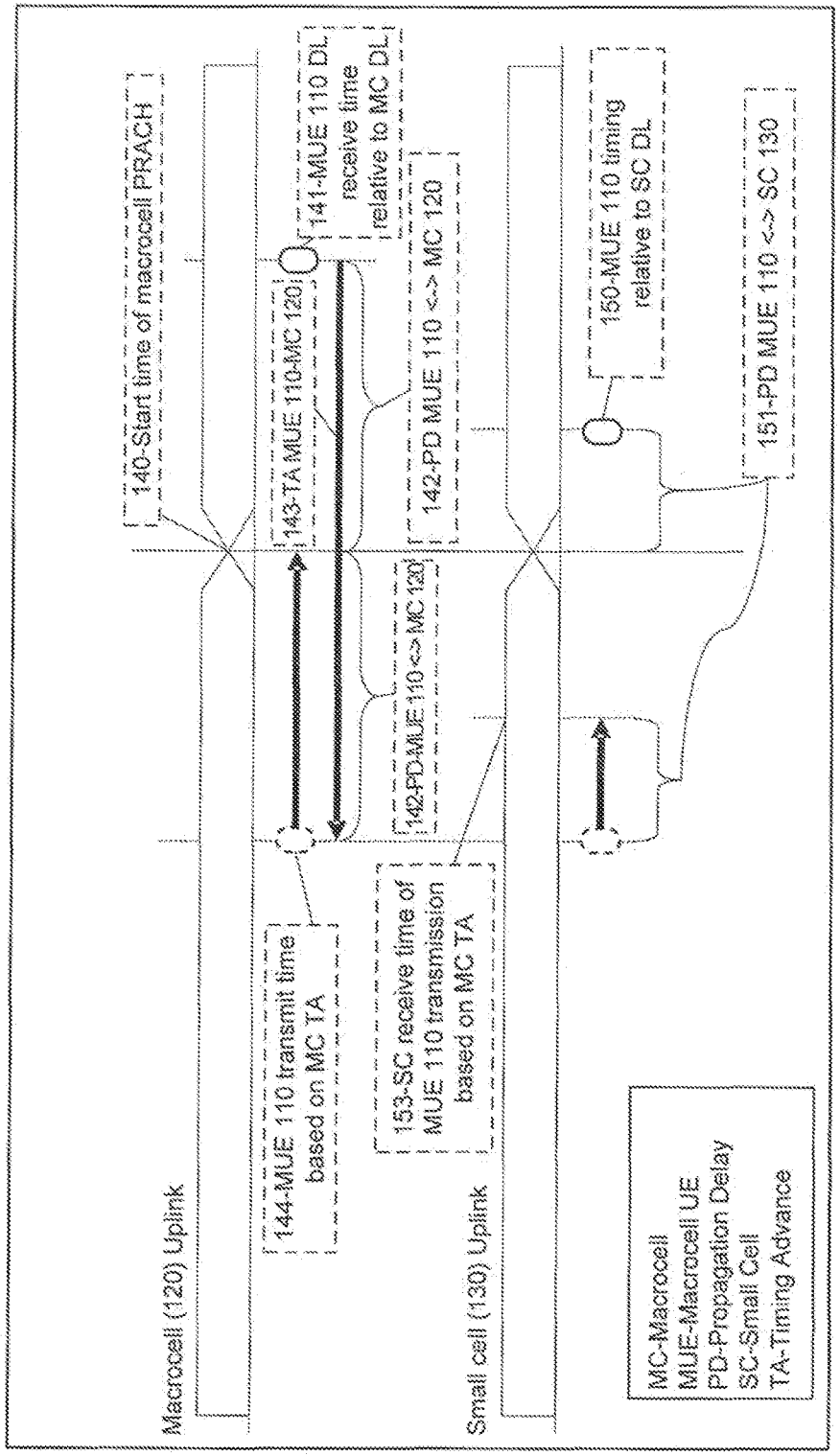
FIG. 7 illustrates example subframes of a macrocell and small cell uplink with example propagation delays, according to an embodiment.

In FIG. 7, the frames and subframes of macrocell 120 and small cell 130 are aligned, i.e., synchronized to each other. For illustration, in FIG. 7, time 140 is the start of the time resource (subframe) where macrocell 120 will receive a preamble transmission from macrocell UE 110. Therefore, according to an embodiment, in an absolute sense, this is also the time at which small cell 130 would expect to receive the macrocell UE's preamble transmissions, since the small cell's and macrocell's frames and subframes are synchronized, and, in accordance with this illustration, macrocell 120 provided small cell 130 with this time in an absolute sense. Time 141 is the corresponding time referenced to the downlink timing of macrocell UE 110, where the downlink timing of macrocell UE 110 is delayed from the macrocell's downlink timing by the amount of propagation delay 142 between macrocell UE 110 and macrocell 120, Time 143 is the timing advance applied by macrocell UE 110 to determine uplink transmission time 144, were the timing advance is provided by macrocell 120 and is twice the value of propagation delay 142 between macrocell UE 110 and macrocell 120. Time 150 is the macrocell UE's timing relative to the small cell downlink and is based on the propagation delay 151 between macrocell UE 110 and small cell 130. Time 153 is the point in time relative to the small cell's timing that the small cell would receive the macrocell UE's preamble transmission, where the time difference between the macrocell UE's preamble transmission and the small cell's reception of that preamble is equal to propagation delay time 151 between macrocell UE 110 and small cell 130.

As illustrated in FIG. 6, macrocell LTE 110 is most likely closer to small cell 130 than to macrocell 120, since macrocell UE 110 is causing uplink interference to small cell 130. Consequently, the macrocell timing advance that macrocell UE 110 is using is likely greater than the propagation delay between macrocell UE 110 and small cell 130, as can be seen in FIGS. 6 and 7. Thus, as illustrated in FIG. 7, the macrocell UE's preamble transmission based on the macrocell timing advance may arrive at small cell 150 before the time expected by small cell 130. This makes preamble detection more difficult since the RA procedure is designed to detect preamble transmissions at a time that is delayed from the expected subframe (i.e., received after the start of the intended subframe, rather than before the intended subframe). To facilitate preamble detection at small cell 130, in an embodiment, macrocell 120 sets the timing advance of macrocell UE 110 to zero before it transmits the preamble. In this case, when the macrocell's and small cell's frames and subframes are synchronized, macrocell UE 110 will transmit the preamble at time 141, and this transmission will be received by small cell 130 at a time delayed from the transmission time by the amount of propagation delay 151 between macrocell UE 110 and small cell 130. Therefore, the preamble will be received by macrocell 130 after the start of the expected subframe. In another embodiment, macrocell 120 sets the timing advance of macrocell UE 110 to half the current value. This would cause macrocell UE 110 to begin uplink transmission at time 140, which is the beginning of the expected receive time referenced at macrocell 120 and small cell 130. This ensures that the preamble is received by small cell 130 after the beginning of the expected receive time, and within the tolerance provided by the timing gap included in the preamble transmission structure.

In an embodiment, macrocell 120 estimates a timing advance (e.g., at or before time t7 in FIG. 2 or 3) for communication between UE 110 and small cell 130. In order to perform this estimation, macrocell 120 may obtain location information for small cell 130. For example, macrocell 120 may receive the location of small cell 130 from small cell 130 (e.g., via an X2 interface in a LTE system). Alternatively, the location of small cell 130 may be received from an Operations and Maintenance (OAM) system and stored in a memory of macrocell 120. Based on the location information of small cell 130, macrocell 120 calculates the distance between itself and small cell 130. Alternatively, the distance between macrocell 120 and small cell 130 may be received from an OAM system and stored in a memory of macrocell 120, in which case no distance calculation is required, Macrocell 120 can then translate the distance between macrocell 120 and small cell 130 into an estimate of a propagation time value between them by dividing the distance by the speed of light. In an embodiment, illustrated in FIG. 6, the macrocell's and email cell's frames and subframes are synchronized, macrocell 120, macrocell UE 110-1, and small 130 are spatially aligned with each other, and macrocell 120 assumes that a potentially interfering UE 110-1 is near the edge of the coverage area of small cell 130. A timing advance for UE 110-1's preamble transmission that is suitable for small cell 130 would be equal to the propagation time between the cells, which can be viewed as the sum of two components; the propagation delay between UE 110-1 and macrocell 120 plus the propagation delay between UE 110-1 and small cell 130. The first component accounts for the delayed timing of the downlink of UE 110-1, and the second component accounts for the propagation delay between UE 110-1 and small cell 130. The amount of time to subtract from the current timing advance can be calculated by macrocell 120 as the difference between the propagation time between the cells and the current timing advance. For this illustrative case, the obtained propagation delay between UE 110-1 and smelt cell 130 can be considered to correspond to the maximum cell radius of small cell 130, since it may be assumed that UE 110-1 is near the edge of the coverage area of small cell 130.

For the case in which the macrocell's and small cell's frames and subframes are not synchronized, the base stations may determine the difference in their timing by exchanging synchronization information or by information received from an OAM system. The timing advance estimation for the macrocell UE's preamble transmission may then by adjusted to compensate for this determined timing difference. From one perspective, the timing difference can be viewed as affecting the distance value used to determine the propagation time between macrocell 120 and small cell 130.

In an embodiment, macrocell 120 may obtain the maximum cell radius of small cell 130. For example, macrocell 120 may receive the maximum cell radius of small cell 130 from small cell 130 (e.g., via an X2 interface in a LTE system). Alternatively, the maximum cell radius of small cell 130 may be received from an OAM system and stored in a memory of macrocell 120. In an embodiment, macrocell 120 assumes that a potentially interfering UE (e.g., UE 110) is near the edge of the coverage area of small cell 130, such that propagation delay 151 between macrocell UE 110 and small cell 130 can be calculated by dividing the maximum cell radius of small cell 130 by the speed of light. This value, plus the propagation delay between UE 110 and macrocell 120, would be a timing advance suitable for the macrocell UE's preamble transmission to small cell 130. In an embodiment, the small-cell-oriented timing advance estimate may be set to the estimated value of propagation delay 151, so that the preamble transmission is still received after the start of the timeframe expected by small cell 130 and there is not a concern that it would arrive before the expected timeframe.

In an embodiment, rather than changing the timing advance of the interfering MUE in order to facilitate small cell 130 receiving the preamble transmission, macrocell 120 may offset the value of the PRACH starting time that it provides to small cell 130. As can be illustrated with reference to FIG. 7, instead of providing small cell 130 with time 140 as, the start time of its PRACH, macrocell 120 may provide time 153, which is the time that small cell 130 would receive the macrocell UE's preamble transmission based on the macrocell timing advance.

In an embodiment, macrocell 120 may compensate for timing uncertainty between the interfering macrocell UE and small cell 130 by providing a wider time range for small cell 130 to receive the interfering macrocell UE's preamble transmission. In LTE, preamble transmission duration can be one millisecond, two milliseconds, or three milliseconds. To facilitate small cell 130 receiving a macrocell UE's preamble transmission, macrocell 120 may, for example, provide a three millisecond window for small cell 130 to receive a one millisecond preamble transmission, where the start of the window is prior to the start time of the macrocell PRACH. In another embodiment, macrocell 120 may provide an on longer window for small cell 130 to receive an interfering macrocell UE's preamble transmission. For example, the duration of the receiving window provided by macrocell 120 to small cell 130 may be the time length of an LTE frame, which consists of ten consecutive subframes and is ten milliseconds in duration. In such a case, small cell 130 does not know the point in time when the preamble will be received, so it may need to search over the entire time window period until it detects the preamble. Additionally, small cell 130 may send to macrocell 120 information about the point in time when the preamble was received, and macrocell 120 and small cell 130 may use this information to determine the timing differences between them. In another embodiment, the interfering macrocell UE may transmit a preamble of longer duration in order to facilitate reception of the preamble by small cell 130. In another embodiment, when small cell 130 is first brought into service, it may receive a downlink signal of macrocell 120 in order to obtain information about its timing differences with macrocell 120.

Of course, the UE may be anywhere around the edge of small cell 130 or anywhere within the coverage area of small cell 130. Thus, in additional or alternative embodiments, UE may utilize conventional techniques for determining a more accurate location of a UE relative to small cell 130 (e.g., Global Position System (GPS) information and/or triangulation). Using the estimate of the location of small cell 130 and the location of a potentially interfering UE and an estimate of the location of the UE relative to macrocell 120, macrocell 120 can estimate the timing advance or timing advance adjustment required for communication between the UE and small cell 130. For instance, as illustrated in FIGS. 4-7, the timing advance required between UE 110 and macrocell 120 is generally greater than the timing advance required between UE 110 and small cell 130. This will generally be the case when UE 110 is closer to small cell 130 than to macro cell 120, as depicted in FIGS. 4 and 6.

Once macrocell 120 calculates an estimated timing advance or timing advance adjustment, this timing advance information can be transmitted to the potentially interfering UE for which it was calculated (e.g., at or before time t7 in FIG. 2 or 3) using a mechanism such as the Timing Advance Command Media Access Control element from the LTE specification. After macrocell 120 receives the preamble transmission, it can set the interfering macrocell UE's timing advance back to a suitable value for transmissions to macrocell 120 using the RA Response message, which is part of the RA procedure and supports setting the timing advance.

It should be understood that the timing advance information may comprise either the timing advance required for the UE to transmit to small cell 130, or a timing advance adjustment which can be applied to the timing advance required for the UE to transmit to macrocell 120 to obtain the timing advance required for the UE to transmit to small cell 130. For example, as shown in FIG. 5, the timing advance for transmission between the UE and small cell 130 is shorter than the timing advance for transmission between the UE and macrocell 120. Accordingly, in this case a timing advance adjustment would comprise a value that can be subtracted from the timing advance for transmission between the UE and macrocell 120 to obtain the timing advance for transmission between the UE and small cell 130.

However, it should be understood that, at the UE (e.g., macrocell UE 110), the timing advance or timing advance adjustment may not be associated with small cell 130. The UE may simply be attempting to communicate with macrocell 120 using the provided timing advance and/or adjustment provided by macrocell 120. That is, the UE is attempting to communicate with macrocell 120 using an estimated timing advance for small cell 130. In an embodiment, UE may be unaware that macrocell 120 is attempting to detect an interfering UE, and may simply be responding as part of what it perceives to be a normal RA procedure. The UE may also be unaware of small cell 130, and that small cell 130 may be receiving the preamble transmitted by the UE.

Example Devices

Figure 8:
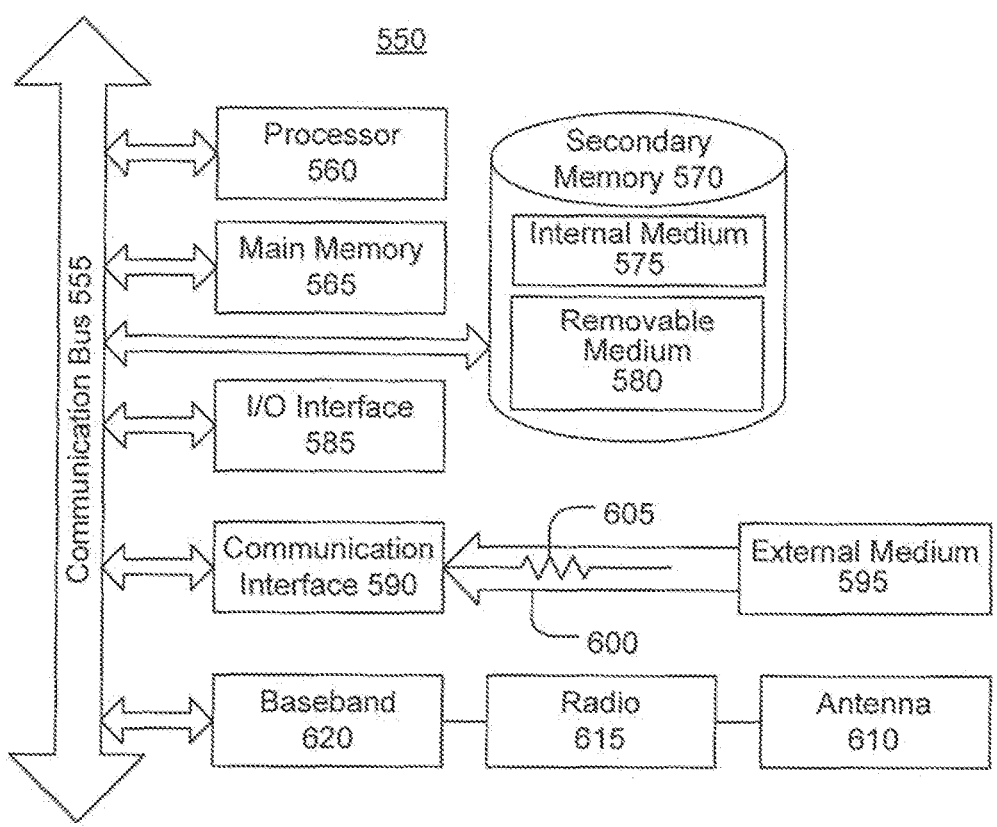
FIG. 8 illustrates an example device that may be used in connection with various embodiments described herein.

FIG. 8 is a block diagram illustrating an example wired or wireless system 550 that may be used in connection with various embodiments described herein. For example the system 550 may be used as, or in conjunction with, a UE, such as UE 110, and/or a base station, such as macrocell 120 and/or small cell 130. The system 550 can be a conventional personal computer, computer server, personal digital assistant, smart phone, tablet computer, vehicle navigation and/or control system, base station controller, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 555 provides storage of instructions and data for programs executing on the processor 560, such as the overlay module and/or handwriting recognition module discussed above. The main memory 565 is typically semiconductor-based memory such as dynamic random access memory ("DRAM") and/or static, random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry-promulgated protocol standards such a Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 800 may be a wired or wireless network, or any variety of other communication links. Communication channel 600 carries signals 605 and can be implemented using a variety of wired or wireless communication means including wire or cable, fiber optics conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer-readable medium" is used to refer to any non-transitory computer-readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer-readable mediums are means for providing executable code, programming instructions, and software to the system 550.

In an embodiment that is implemented using software, the software may be stored on a computer-readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over is data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RE signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna tort for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 and/or 570 may include various software modules (not shown) that were previously described with respect to FIGS. 2 and 3.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality varying ways for each particular application, but such implementation decisions should not be interpreted as causing a departure from the scope of the invention. In addition, the grouping of functions within a module, block, circuit or step is for as of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skied in the art to make or use the invention. Various modifications to these embodiments will be read apparent to those skilled in the art, and the generic principles described herein can be applied to other embodiments without departing from the spirit or scope of the invention. Thus, it is to be understood that the description and drawings presented herein represent certain embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method for identifying a user device being served by a first base station of a cellular network and causing radio interference in the uplink of a second base station, the method comprising, by the first base station:
   transmitting configuration information for the first base station to the second base station, wherein the configuration information comprises an identification of one or more resources allocated to an uplink channel of the first base station;
   receiving an interference indication message from the second base station, the interference indication message comprising an indication that a cell of the second base station is experiencing uplink interference from at least one interfering user device;
   for each of a plurality of user devices being served by the first base station, assigning a preamble to the user device;
   transmitting the preambles assigned to the plurality of user devices to the second base station;
   for each of the plurality of user devices, transmitting a message comprising the preamble, assigned to the user device, to the user device;
   receiving an information element from the second base station, wherein the information element comprises
      a list of one or more preambles which were detected at the second base station, on an uplink channel, from one or more preamble transmissions of one or more of the plurality of user devices, and
      a received signal strength for each of the one or more preambles which were detected at the second base station, and wherein identifying the at least one interfering user device is also based, at least in part, on the received signal strengths; and
   identifying the at least one interfering user device based, at least in part, on the list of preambles.

2. The method of claim 1, further comprising, for each of the plurality of user devices, further assigning one of a plurality of preamble transmission times to the user device, wherein the message transmitted to the user device further comprises the assigned preamble transmission time.

3. The method of claim 2, wherein the uplink channel is a Physical Random Access Channel (PRACH) of the first base station, and wherein the message transmitted to each of the plurality of user devices comprises a Physical Downlink Control Channel (PDCCH) order that causes the user device to initiate a Random Access (RA) procedure by transmitting the assigned preamble at the assigned preamble transmission time.

4. The method of claim 3, further comprising, by the second base station:
   receiving one or more preambles from one or more user devices on the PRACH of the first base station using the identification of one or more resources; and
   transmitting the information element, comprising the received one or more preambles as the list of one or more preambles, to the first base station.

5. The method of claim 4, further comprising, by the second base station detecting the signal strength of each of the received one or more preambles, wherein the transmitted information element further comprises the detected signal strength for each preamble in the list of one or more preambles.

6. The method of claim 1, further comprising, by the first base station, for each of the plurality of user devices:
   estimating timing advance information comprising a transmission delay between the user device and the second base station; and
   transmitting the estimated timing advance information to the user device.

7. The method of claim 6, wherein estimating timing advance information comprises:
   determining a location of the user device;
   determining a location of the second base station; and
   estimating a propagation distance between the user device and the second base station.

8. The method of claim 1, wherein each assigned preamble is unique from the other assigned preambles.

9. The method of claim 1, further comprising, by the first base station, performing at least one corrective action.

10. The method of claim 9, wherein the at least one corrective action comprises one or more of initiating a handover procedure of the at least one interfering user device from the first base station to the second base station, and initiating a handover procedure of the at least one interfering user device from a first radio carrier to a second radio carrier.

11. The method of claim 1, further comprising, by the first base station, for each assigned preamble, storing an association between the preamble and the assigned user device, and wherein identifying the at least one interfering user device comprises identifying an association between at least one of the one or more preambles in the list of one or more preambles and a user device assigned to the at least one preamble.

12. The method of claim 1, further comprising, by the first base station, selecting the plurality of user devices, wherein the plurality of user devices consists of fewer than all user devices being served by the first base station.

13. The method of claim 1, further comprising, by the first base station, transmitting to the second base station an identification of one or more resources to be used for preamble transmissions by the plurality of user devices.

14. The method of claim 1, wherein the interference indication message comprises an indication that uplink interference is occurring on a particular carrier.

15. A system for mitigating interference at a base station of a cellular network by identifying an interfering user device, the system comprising a first base station configured to:
   transmit configuration information for the first base station to a second base station, wherein the configuration information comprises an identification of one or more resources allocated to an uplink channel of the first base station;
   receive an interference indication message from the second base station, the interference indication message comprising an indication that a cell of the second base station is experiencing uplink interference from at least one interfering user device;
   for each of a plurality of user devices being served by the first base station, assign a preamble to the user device;
   transmit the preambles assigned to the plurality of user devices to the second base station;
   for each of the plurality of user devices, transmit a message comprising the preamble, assigned to the user device, to the user device;
   receive an information element from the second base station, wherein the information element comprises a
      list of one or more preambles which were detected at the second base station, on an uplink channel, from one or more preamble transmissions of one or more of the plurality of user devices, and
      a received signal strength for each of the one or more preambles which were detected at the second base station, and wherein identifying the at least one interfering user device is also based, at least in part, on the received signal strengths; and
   identify the at least one interfering user device based, at least in part, on the list of preambles.

16. The system of claim 15, wherein the first base station is further configured to, for each of the plurality of user devices, assign one of a plurality of preamble transmission times to the user device, wherein the message transmitted to the user device further comprises the assigned preamble transmission time.

17. The system of claim 16, wherein the uplink channel is a Physical Random Access Channel (PRACH) of the first base station, and wherein the message transmitted to each of the plurality of user devices comprises a Physical Downlink Control Channel (PDCCH) order that causes the user device to initiate a Random Access (RA) procedure by transmitting the assigned preamble at the assigned preamble transmission time.

18. The system of claim 17, further comprising the second base station, wherein the second base station is configured to:
   receive one or more preambles from one or more user devices on the PRACH of the first base station using the identification of one or more resources; and
   transmit the information element, comprising the received one or more preambles to the first base station as the list of preambles, to the first base station.

19. The system of claim 18, wherein the second base station is further configured to detect the signal strength of each of the received one or more preambles, wherein the transmitted information element further comprises the detected signal strength for each preamble in the list of one or more preambles.

20. The system of claim 15, wherein the first base station is further configured to, for each of the plurality of user devices:
   estimate timing advance information comprising a transmission delay between the user device and the second base station; and
   transmit the estimated timing advance information to the user device.

21. The system of claim 20, wherein estimating timing advance information comprises:
   determining a location of the user device;
   determining a location of the second base station; and
   estimating a propagation distance between the user device and the second base station.

22. The system of claim 15, wherein each assigned preamble is unique from the other assigned preambles.

23. The system of claim 15, wherein the first base stations is further configured to perform at least one corrective action.

24. The system of claim 23, wherein the at least one corrective action comprises one or more of initiating a handover procedure of the at least one interfering user device from the first base station to the second base station, and initiating a handover procedure of the at least one interfering user device from a first radio carrier to a second radio carrier.

25. The system of claim 15, wherein the first base station is further configured to, for each assigned preamble, store an association between the preamble and the assigned user device, and wherein identifying the at least one interfering user device comprises identifying an association between at least one of the one or more preambles in the list of one or more preambles and a user device assigned to the at least one preamble.

26. The system of claim 15, wherein the first base station is further configured to select the plurality of user devices, wherein the plurality of user devices consists of fewer than all user devices being served by the first base station.

27. The system of claim 15, wherein the first base station is further configured to transmit to the second base station an identification of one or more resources to be used for preamble transmissions by the plurality of user devices.

28. The system of claim 15, wherein the interference indication message comprises an indication that uplink interference is occurring on a particular carrier.

* * * * *